(12) United States Patent
Tsunoda et al.

(10) Patent No.: US 6,418,627 B1
(45) Date of Patent: Jul. 16, 2002

(54) ROTARY CUTTER OF MOWER

(75) Inventors: Shuhei Tsunoda; Keizo Shimizu; Minoru Shibazaki; Hideki Hashiba, all of Gunma (JP)

(73) Assignee: Starting Industrial Co. Perfecture Ltd., Tokyo (JP)

( * ) Notice: Subject to any disclaimer, the term of this patent is extended or adjusted under 35 U.S.C. 154(b) by 0 days.

(21) Appl. No.: 09/503,475

(22) Filed: Feb. 14, 2000

(30) Foreign Application Priority Data

Mar. 16, 1999 (JP) .......................................... 11-069723

(51) Int. Cl.[7] .............................. B26B 7/00; A01D 34/67
(52) U.S. Cl. ............................. 30/347; 30/276; 56/12.7
(58) Field of Search ..................... 30/347, 276; 56/12.5, 56/12.7

(56) References Cited

U.S. PATENT DOCUMENTS

| | | | | | |
|---|---|---|---|---|---|
| 4,236,311 A | * | 12/1980 | Mitchell | ...................... | 30/276 |
| 4,259,782 A | * | 4/1981 | Proulx | .......................... | 30/276 |
| 4,274,201 A | * | 6/1981 | Oberg et al. | .................... | 30/276 |
| 4,276,691 A | * | 7/1981 | Palmieri et al. | .............. | 30/347 |
| 4,458,419 A | * | 7/1984 | Proulx | .......................... | 30/347 |
| 4,584,771 A | * | 4/1986 | Tillotson | ...................... | 30/276 |
| 4,656,739 A | * | 4/1987 | Pittinger, Jr. | .................. | 30/276 |
| 4,823,465 A | * | 4/1989 | Collins | ......................... | 30/276 |
| 5,293,691 A | * | 3/1994 | Sugihara et al. | .............. | 30/347 |
| 6,141,879 A | * | 11/2000 | Arnetoli | ...................... | 30/276 |
| 6,148,523 A | * | 11/2000 | Everts et al. | .................. | 30/276 |

\* cited by examiner

Primary Examiner—M. Rachuba
(74) Attorney, Agent, or Firm—Breiner & Breiner, L.L.C.

(57) ABSTRACT

A rotary cutter for a mower is provided wherein the cord delivering operation, which is necessary when the free end of the cord is worn, is carried out only when the rotary cutter is rotated at a low speed or is stopped. The rotary cutter includes a cord for cutting grass upon rotation thereof, a reel which holds the cord and allows delivering of the cord while the reel is intermittently rotated, a cover for a case which houses the reel, and a press body which protrudes downwardly from the case and is movable in an axial direction upon pressing so as to intermittently rotate the reel. A return spring for biasing the press body in a direction to protrude the press body from the case between the reel and the press body is also provided. The press body and the case engage each other such that the press body is slidable in an axial direction while preventing relative rotation with each other. By pressing the press body against the biasing return spring, a set of protrusions formed on the press body are detachably engaged with protrusions formed on the reel so as to intermittently rotate the reel.

5 Claims, 6 Drawing Sheets

ROTARY CUTTER OF MOWER

FIELD OF THE INVENTION

The present invention relates to a rotary cutter of a mower for performing a mowing operation of grass or the like with a cord radially extended from a case which is rotatably driven by an engine or the like by way of a shaft.

DESCRIPTION OF THE PRIOR ART

Conventionally, a system which accommodates a cord in a reel has been used as this kind of technique. To deliver the cord when the free end side of the cord is worn, an engine is stopped and a cutter portion is partially disassembled, or bolts are loosened, or, as disclosed in Japanese Laid-open Publication SHO57-5608, a press body for moving a reel in an axial direction is mounted on a distal end of mounting shaft of a cutter and this press body is pushed into the reel while the cutter is rotated so that the phase between the reel and a housing is slipped thus enabling the delivering of the cord.

In the conventional rotary cutters having the above-mentioned constitutions, however, the former necessitates an extremely cumbersome manipulation for delivering the cord, while the latter pushes the press body into the reel by strongly striking the press body while the rotary cutter is rotated, the free end side of the cord is lowered and hence, the cord scatters pebbles or the like thus making the mowing operation dangerous. Further, in disassembling the rotary cutter, respective parts are separated and there has been a problem that extremely cumbersome steps and an utmost care become necessary in reassembling.

Further, in case the shape of the mower side is different, there has been a case that the cover cannot be mounted and hence, depending on the mower, the rotary cutter cannot be used.

SUMMARY OF THE INVENTION

It is an object of the present invention to provide a rotary cutter of a mower which can overcome the above-mentioned technical problems and is constructed such that the cord delivering operation which becomes necessary at the time that the free end side of the cord is worn out, can be carried out only at the time of the low speed rotation or the non-rotation of the rotary cutter so that the scattering of pebbles can be prevented and respective parts are prevented from being separated at random at the time of disassembling thus facilitating the reassembling, and a cover can be replaced depending on the shape of the mower side.

To achieve the above-mentioned object, the rotary cutter of the present invention includes a cord for carrying out a mowing of grass or the like along with a rotation thereof, a reel which accommodates the cord and allows delivering of the cord, while being intermittently rotated, a cover which covers a case accommodating the reel, and a press body which is protruded downwardly from the ease and is movable in an axial direction by pressing so as to intermittently rotate the reel, wherein the improvement is characterized in that means for biasing the press body in a direction to protrude the press body from the case is disposed between the reel and the press body, the press body and the case are engaged with each other such that the press body is slidable in an axial direction while a relative rotation between them is prevented, and by pressing the press body against the biasing means, a set of protrusions formed on the press body are engaged with or disengaged from protrusions formed on the reel so as to intermittently rotate the reel. Further, it is preferable to form an elongated hole in the reel into which one of a set of protrusions formed on the press body is fitted. Further, it is preferable to construct the rotary cutter of the mower such that ratchets held in place by the biasing means are expanded by a centrifugal force generated by the high speed rotation of the rotary cutter so as to prevent the axial slide movement of the press body. Further, it is preferable that the biasing means is constituted by a return spring disposed between the reel and the press body. Further, it is preferable that resiliently deformable pawls which are formed on the central portion of the press body are engaged with a cylindrical portion formed on the central portion of the reel. Furthermore, it is preferable that the cover is constituted by either a plastic member provided with a female threaded member at a central portion thereof for mounting the rotary cutter to the mower or a thin metal plate member provided with a hole at a central portion thereof for mounting the rotary cutter to the mower.

DETAILED DESCRIPTION OF THE PREFERRED EMBODIMENTS

A rotary cutter of a mower of one embodiment of the present invention is hereinafter explained in detail in conjunction with attached drawings.

In the present invention, as shown in FIG. 1 to FIG. 5, a reel 1 is rotatably accommodated in a case 2 made of a bottomed cylinder. The reel 1 accommodates a cord or cords 7 which have the peripheral portions thereof formed of nylon. The reel 1 is provided with means (not shown) which fixedly secures a central portion of the cord 7 (in a case where one cord is used) or one end portions (in a case where two cords are used). A recess groove 1-2 divided in two by an annular wall 1-1 which prevents an entanglement of the cord is formed on the outer peripheral portion of the reel 1. Further, a through-hole 1-3 is formed in the central portion of the reel 1 and a plurality of protrusions 1-4 which protrude inwardly are formed in an equally spaced-apart manner in a circumferential direction on an inner surface of the through-hole 1-3. Further, a cylindrical portion 1-6 which is supported by a flange 1-5 extending in a radial direction is integrally provided in the inside of the through-hole 1-3. The cylindrical portion 1-6 and through hole 1-3 are disposed coaxially, while a plurality of elongated holes 1-8 are formed in the flange 1-5 on the same circumference in an equally spaced-apart manner.

The case 2 is provided with an outlet 2-1 for letting the cord 7 out in a direction opposed to the outer peripheral surface of the case 2 and a circular hole 2-3 is formed in the central portion of a bottom portion 2-2 of the case.

Hooks 2-5 which are directed outwardly are formed on the open-ended edge portion of the case 2 and these hooks 2-5 are constructed such that they can be engaged with holes 3-1 formed in the outer peripheral portion of a cover 3 which is mounted such that it covers the entire surface of the open-ended edge portion of the case 2. That is, by fitting the hooks 2-5 into the holes 3-1, the cover 3 can be replaceably mounted on the case 2. A housing A is constituted by the case 2 and the cover 3.

Further, a female thread member 3-2 for mounting the rotary cutter to the mower is fixedly secured to the central portion of the cover 3 and a threaded portion 3-3 in which a shaft portion (not shown) of a mower body is screwed is provided to the female thread member 3-2.

On the other hand, in the inside of the housing A which is formed by the case 2 and the cover 3, a press body 4 made of a bottomed cylindrical body is accommodated. The press body 4 is fitted into the inside of the through-hole 1-3 and is biased by a return spring 6 such that the bottom portion thereof is protruded through the circular hole 2-3 of the case 2. On the open peripheral portion of the press body 4, a plurality of protrusions 4-1 which are protruded upwardly and outwardly are formed in the same equally spaced-apart manner corresponding to the protrusions 1-4 formed on the inner peripheral surface of the reel 1. Further, a plurality of arm-like resilient ribs 4-3 are axially protruded from a bottom portion 4-2 of the press body 4 and pawl portions 4-4 which are formed on free ends of the ribs 4-3 are engaged with the annular shoulder portion 1-7 of the cylindrical portion 1-6 disposed in the inside of the through-hole 1-3 of the reel 1.

Protrusions 4-5 are formed on the outer peripheral surface of the press body 4 such that the protrusions 4-5 extend in an axial direction, while recessed grooves 2-7 which extend in an axial direction are formed on the inner peripheral surface of a cylindrical wall 2-6 which protrudes in an axial direction from the peripheral portion of the circular hole 2-3 of the case 2. By engaging the protrusions 4-5 with the recessed grooves 2-7, a constitution which prevents the relative rotation between the case 2 and the press body 4 but allows the relative slide movement in an axial direction is formed.

The return spring 6 is extended such that the return spring 6 has one end thereof brought into contact with the bottom portion 4-2 of the press body 4 so as to bias the press body 4 in a downward direction and the other end brought into contact with the short side portions 5-2 of approximately L-shaped ratchets 5 which are pivotably mounted on the flanges 1-5 by way of pivoting shafts 5-1. Due to such a constitution, unless a centrifugal force generated by a high-speed rotation is applied to the housing A made of the case 2 and the cover 3, that is, at the time of non-operating (stop) condition or at the time of low-speed rotation, the long side portions 5-3 of the L-shaped ratchets 5 are positioned parallel to the inner peripheral wall of the press body 4 (see FIG. 1), while once the housing A is rotated at a high speed, the centrifugal force acts on the long side portions 5-3 against the return spring 6 and expands the free ends 5-4 of the long side portions 5-3 in an outwardly radial direction so that the long side portions 5-3 are engaged with the annular shoulder portion 4-6 formed on the inner peripheral surface of the press body 4 (see FIG. 2).

Subsequently, to explain the positional relationship between the protrusions 4-1 and the protrusions 4-5 formed on the press body 4 and the protrusions 1-4 formed on the through-hole 1-3 of the reel 1, the protrusions 4-1 and 4-5 have their phases shifted axially from each other and they have their phases shifted also in a circumferential direction at an interval larger than the width of the protrusions 1-4 of the reel 1. That is, the width of the protrusions 1-4 of the reel 1 is designed such that when the press body 4 is slid in an axial direction, the protrusions 1-4 of the reel 1 are moved and positioned in the spaces defined between the protrusions 4-1 and the protrusions 4-5 of the press body 4.

The manner of operating the rotary cutter of the mower of the present invention having the above-mentioned constitution is explained hereinafter.

Figure 1:
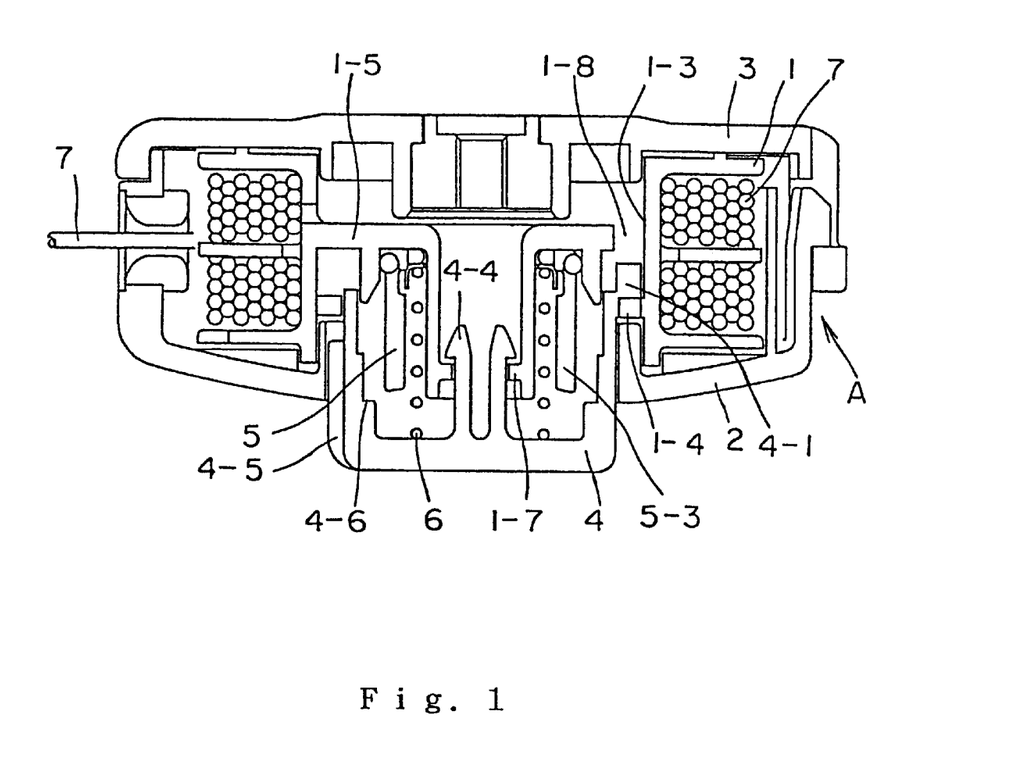
FIG. 1 is a cross sectional view of a rotary cutter of a mower of one embodiment of the present invention in a non-rotating condition or in a low-speed rotating condition.

Firstly, in the non-operating condition or in the low-speed rotating condition, as shown in FIG. 11, the press body 4 is biased downwardly by means of the return spring 6, while the annular shoulder portion 1-7 in the inside of the cylindrical portion 1-6 of the reel 1 and the pawls 4-4 formed on the distal ends of the resilient ribs 4-3 of the press body 4 are engaged with each other and hence, a further downward movement of the press body 4 is prevented. In this condition, the biasing force of the return spring 6 acts on the short side portions 5-2 of the ratchets 5 and hence, the long side portions 5-3 of the ratchets are held in parallel with the inner peripheral wall of the press body 4.

Subsequently, when the mower starts the high-speed rotation, this rotation brings about the rotation of the whole cover 3 by way of the shaft female-threaded member 3-2 and the case 2 is integrally rotated with the cover 3 due to the engagement between the hole 3-1 and the hook 2-5 and hence, whole the housing A is rotated. Due to the engagement between the recessed grooves 2-7 formed on the cylindrical wall 2-6 of the case 2 and the protrusion 4-5 formed on the outer peripheral surface of the press body 4, the press body 4 is also rotated integrally with the housing A. Further, since the protrusions 4-1 of the press body 4 are engaged with the protrusions 1-4 of the reel 1, the housing A and the reel 1 are integrally rotated. Due to this rotation of the reel 1, the cord 7 which is fixedly secured to the recessed groove 1-2 of the reel 1 and is extended outwardly through the opening 2-1 is rotated and mows lawn, grass or the like with the free end portion thereof.

Figure 2:
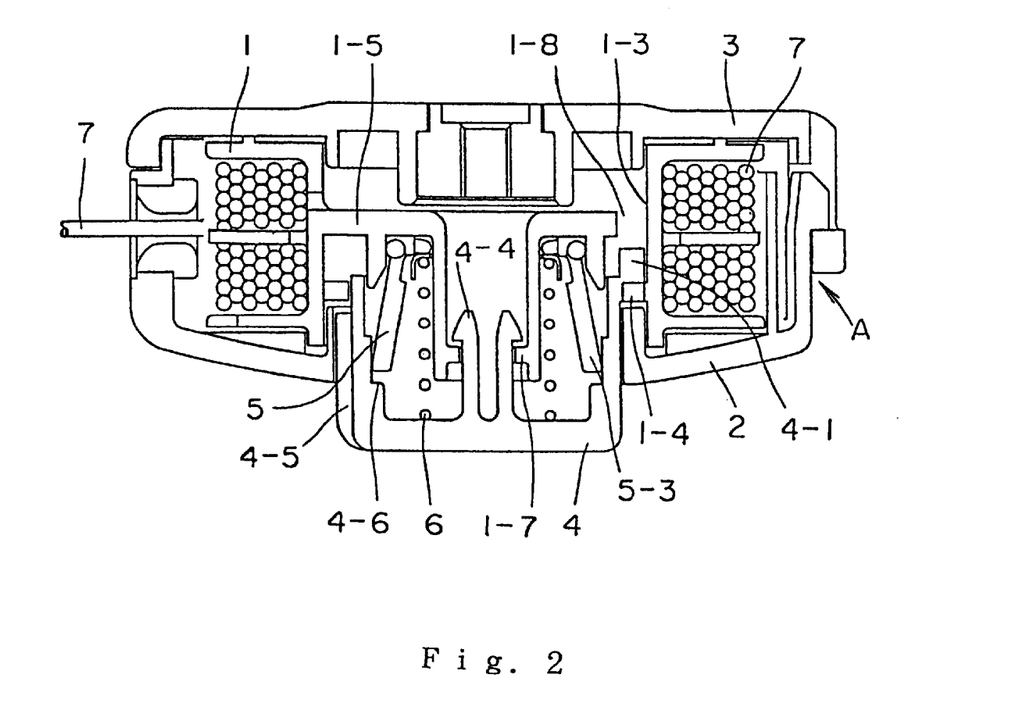
FIG. 2 is a cross sectional view of a rotary cutter of a mower of one embodiment of the present invention in a high-speed rotating condition.

In this manner, at the time of the high-speed rotation of the housing A constituted-by the case 2 and the cover 3, the centrifugal force acts on the long side portions 5-3 of the ratchets 5 and the free ends 5-4 of the long side portions 5-3 are expanded in an outward radial direction against the return spring 6 and take a position shown in FIG. 2 where the free ends 5-4 can be engaged with the shoulder portion 4-6 of the press body 4 and hence, even when the press body 4 is strongly struck in the ground, the press body 4 is prevented from moving upwardly by an axial slide movement thereof.

Figure 3:
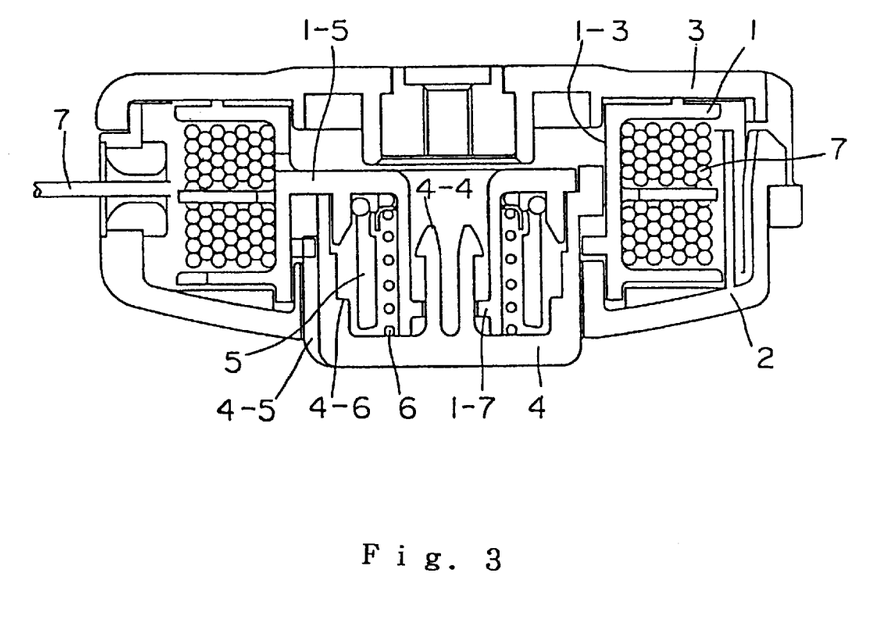
FIG. 3 is a cross sectional view of a rotary cutter of a mower of one embodiment of the present invention in a low-speed rotating condition with a press body in a pressed condition.
Figure 4:
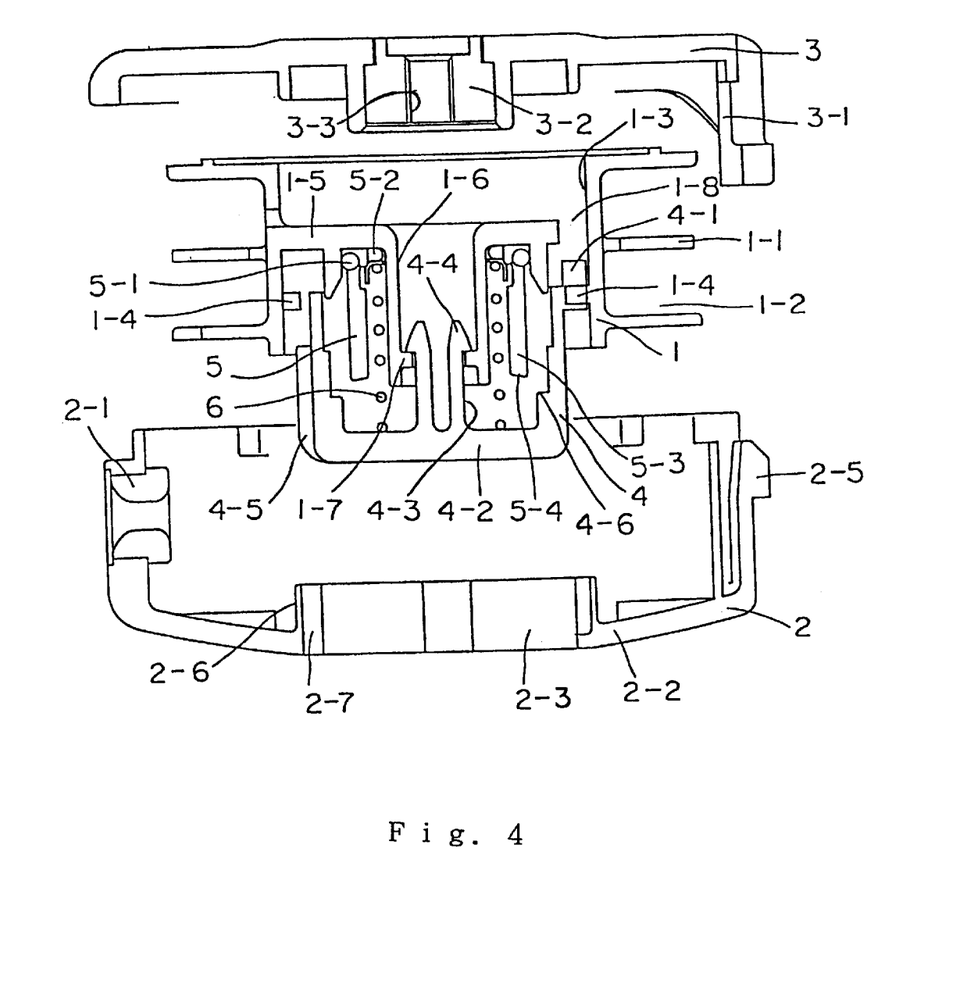
FIG. 4 is an exploded cross sectional view of a rotary cutter of a mower of one embodiment of the present invention.
Figure 5:
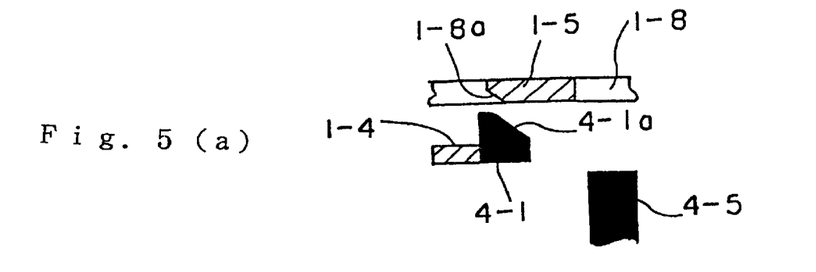
FIGS. 5a–5d are an explanatory view of a rotary cutter of a mower of one embodiment of the present invention showing the condition where a cord is delivered from a reel.

On the other hand, in case the free end side of the cord 7 being used is worn out and the cord 7 becomes short, it becomes necessary to deliver the cord 7 from the reel 1. In such a case, at the time that no centrifugal force acts on the long side portions 5-3 of the ratchets 5 so that the long side portions 5-3 are held in parallel with the inner peripheral surface of the press body 4 whereby the housing A is rotated at a low speed (see FIG. 5(a)), the press body 4 is struck in the ground as shown in FIG. 3 so as to move the press body 4 upwardly against the return spring 6.

Here, along with the upward movement of the press body 4, the protrusions 4-1 are moved together (see FIG. 5(b)) so that the protrusions 4-1 are disengaged from the protrusions 1-4 of the reel 1. Accordingly, although the press body 4 to which the rotation of the mower is directly transferred maintains its rotation at the present rotational speed, the rotation of the reel 1 which is disengaged from the protrusions 4-1 of the press body 4 is carried out only by the inertia and hence is lowered. Due to such lowering of the rotational speed of the reel 1, the rotation of the press body 4 precedes the rotation of the reel 1 and the protrusions 4-5 take a condition where the protrusion 4-5 are brought into contact with succeeding protrusions 4-1 of the downstream side in a rotating direction (see FIG. 5(c)). Then, due to the restoring force of the return spring 6, the press body 4 is moved downwardly and the succeeding protrusions 4-1 of the press body 4 return to the position of the protrusions 1-4 of the reel 1 (see FIG. 5(d)). Subsequently, the succeeding protrusions 4-1 of the press body 4 are brought into contact with the succeeding protrusions 1-4 and take the position shown in FIG. 5(a). That is, the reel 1 is intermittently rotated by the distance between the protrusions 1-4 of the reel 1.

In this manner, at the time of the low speed rotation of the housing A, every time the press body 4 is struck in the ground, the cord 7 is delivered from the reel 1 by the length corresponding to the circumferential distance between the protrusions 1-4 and hence, if an operator strikes the press body 4 in the ground given times, the cord 7 of the given length is delivered from the reel 1.

On the other hand, in case the cord 7 is delivered at the time the rotary cutter is stopped, firstly, the press body 4 is struck in the ground and the press body 4 is moved upwardly against the return spring 6. Here, since the rotary cutter is not rotated, inclined surfaces 4-1a formed on the rear brim portions of the upper end of the lifted protrusions 4-1 at a downstream side in a rotating direction are brought into contact with inclined surfaces 1-8a formed in an equally spaced-apart manner on the front brim portions of the lower end of a plurality of elongated holes 1-8 formed in the flange 1-5 of the reel 1 at an upstream side in a rotating direction. Due to such a contact of these inclined surfaces, the elongated holes 1-8 are slightly pushed in a rearward direction as shown in FIG. 5(b). Subsequently, the press body 4 is lowered due to the restoring force of the return spring 6 and hence, the protrusions 4-1 of the press body 4 take a condition where they run aground the protrusions 1-4 of the reel 1. Here, if the operator pulls the cord 7, the reel 1 is rotated in a reverse direction and the protrusions 4-1 are slid on the upper surfaces of the protrusions 1-4 to take the position shown in FIG. 5(d), whereby the cord 7 can be delivered.

Accordingly, in this case, when the operator strikes the press body 4 in the ground given times so as to deliver the cord 7, the cord 7 is also delivered a given length from the reel 1.

Then, in case the cord 7 of the rotary cutter of the mower according to the present invention is worn so that the cord must be replaced or in case the rotary cutter must be disassembled to exchange or inspect the parts inside the rotary cutter for repairing, firstly the hooks 2-5 of the case 2 is disengaged from the holes 3-1 of the cover 3 so that the case 2 can be removed downwardly. Then, the reel 1 and the press body 4 are removed from the cover 3 and the cord 7 is replaced. In such an operation, the press body 4 which incorporates the return spring 6 and the approximately L-shaped ratchets 5 therein is not separated from the reel 1 due to the engagement between the pawl portions 4-4 formed on the distal end portions of the arm-shaped resilient ribs 4-3 of the press body 4 and the annular shoulder portion 1-7 of the cylindrical portion 1-6 disposed inside the through-hole 1-3 of the reel 1 and hence, the reassembling becomes extremely easy.

In replacing the return spring 6 and the approximately L-shaped ratchets 5 incorporated in the inside of the press body 4, to disengage the pawl portions 4-4 from the annular shoulder portion 1-7, the press body 4 is strongly pulled downwardly. Due to such a pulling operation, the arm-shaped resilient ribs 4-3 are deflected and hence, the press body 4 can be removed from the reel 1 thus the press body 4 and the reel 1 can be separated from each other.

Further, in case the press body 4 is to be reassembled to the reel 1, the ratchets 5 and the return spring 6 are firstly incorporated in the inside of the press body 4 and thereafter the resilient ribs 4-3 of the press body 4 are forcibly pushed into the inside of the cylindrical portion 1-6 of the reel 1 in an axial direction. Due to such an operation, contrary to the above-mentioned disassembling operation, the diameter of the deflectable pawl portions 4-4 of the arm-shaped resilient ribs 4-3 is narrowed by the annular shoulder portion 1-7 and then after getting over the annular shoulder portion 1-7, the arm-shaped resilient ribs 4-3 are expanded to take the original condition due to the resiliency of the resilient ribs 4-3 so that the condition where the pawl portions 4-4 are engaged with the annular shoulder portion 1-7 is obtained.

Figure 6:
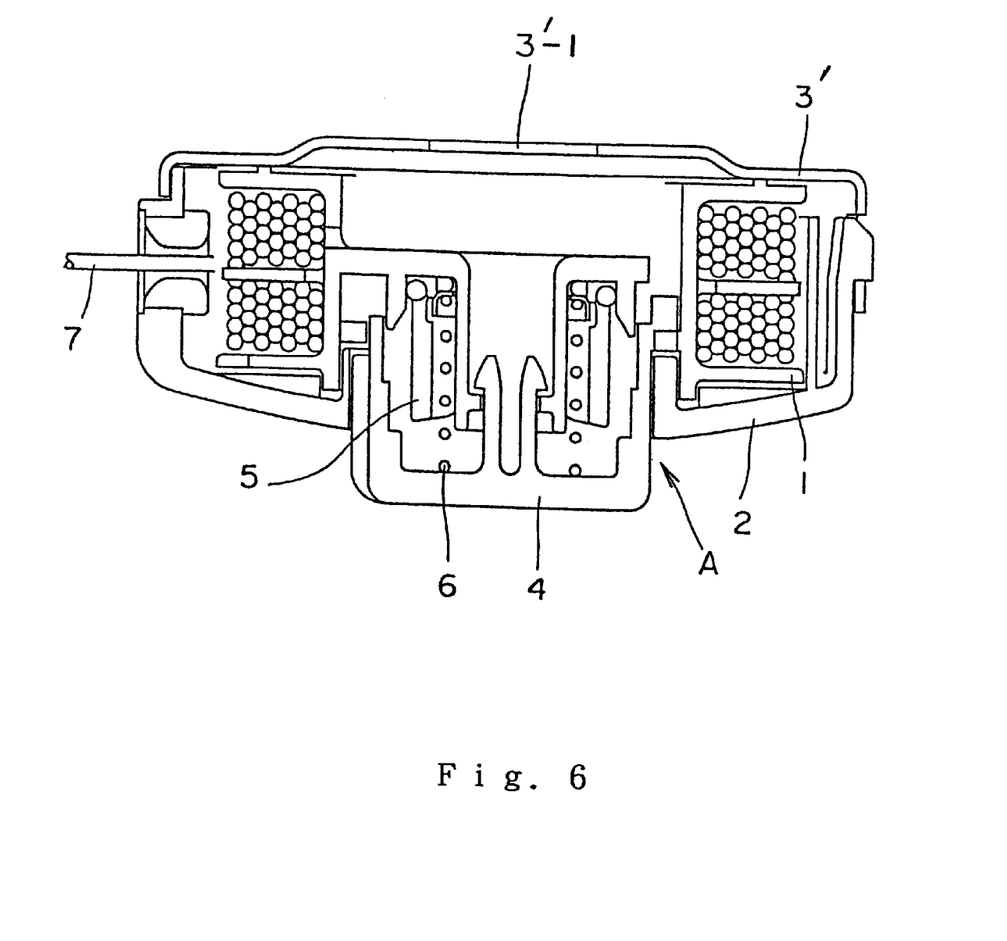
FIG. 6 is a cross sectional view of a rotary cutter of a mower of another embodiment of the present invention in a non-rotating condition or in a slow-speed rotating condition.

In the embodiment which has been explained heretofore, although the cover 3 is explained as one which is molded by plastic material and is provided with a female threaded member for mounting the rotary cutter to the mower at the central portion thereof, the rotary cutter of the mower of the present invention may be Constituted such that a cover 3' is formed of a thin metal plate as shown in FIG. 6 and a hole 3'-1 for mounting the rotary cutter to the mower is formed in a central portion thereof.

In this manner, the shape of the mounting portion of the covers 3, 3' to the mower can be suitably selected and hence, the rotary cutter can be used while replacing the cover depending on the shape of mower side.

As has been described heretofore, according to the present invention, the cord delivering operation which becomes necessary when the free end side of the cord is worn can be carried out only when the rotary cutter is rotated at a low speed or is not operated (stopped). Accordingly, the present invention can provide the rotary cutter of the mower which has advantages that the scattering of the pebble stones can be prevented, parts are not separated at random at the time of disassembling the rotary cutter so that reassembling is facilitated, and the cover can be replaced depending on the shape of the mower side.

What is claimed is:

1. A rotary cutter of a mower comprising
   a cord for mowing grass upon rotation thereof,
   a reel which removably holds said cord and serves to deliver said cord while said reel is intermittently rotated,
   a cover for a case which contains said reel,
   a unitary press body which protrudes downwardly from said case and is movable in an axial direction upon pressing so as to intermittently rotate said reel, and
   a means for biasing said press body in a direction to protrude said press body from said case,
   wherein said means for biasing is disposed between said reel and said press body, said press body and said case are engaged with each other such that said press body is slidable in an axial direction while relative rotation between said press body and said case is prevented, and upon pressing said press body against said means for biasing, a set of protrusions formed on said press body are detachably engaged with protrusions formed on said reel so as to intermittently rotate said reel.

2. A rotary cutter of a mower according to claim 1, wherein said reel includes an elongated hole into which one of the set of protrusions formed on the press body fits.

3. A rotary cutter of a mower according to claim 1, further comprising ratchets which are held in place by said means for biasing and which are constructed and arranged to expand upon centrifugal force generated by high speed rotation of said rotary cutter to prevent axial slide movement of said press body.

4. A rotary cutter of a mower according to claim 3, wherein said means for biasing is a return spring disposed between said reel and said press body.

5. A rotary cutter of a mower according to claim 1 further comprising deflectable pawls which are part of a central portion of said press body and are engaged with a cylindrical portion formed on the central portion of said reel.

* * * * *